UNITED STATES PATENT OFFICE.

JAMES S. ARMSTRONG, OF LISBON, MAINE, ASSIGNOR TO FARNSWORTH COMPANY, OF LISBON, MAINE, A CORPORATION.

PROCESS OF BLEACHING UNION COTTON AND WOOL GOODS.

977,848.     Specification of Letters Patent.     Patented Dec. 6, 1910.

No Drawing.     Application filed June 23, 1910. Serial No. 568,512.

*To all whom it may concern:*

Be it known that I, JAMES S. ARMSTRONG, a subject of Great Britain, residing at Lisbon, in the county of Androscoggin and State of Maine, have invented certain new and useful Improvements in Processes of Bleaching Union Cotton and Wool Goods, of which the following is a specification.

This invention relates to an improved process of bleaching union cotton and wool goods. The process of treating such goods as at present practiced consists in first saturating the fabric with a neutral soap in the fulling mill, so called, following the ordinary process of fulling the goods. The goods thus saturated and impregnated with the natural grease of the wool and more or less foreign vegetable matter are then transferred to the washer a quantity of water added and a lather raised in the goods by agitating them. The goods are then thoroughly rinsed in pure water to remove the soap. The goods are then subjected to the fumes of sulfur to complete the bleaching process.

This invention consists in subjecting the goods while in the washer to the action of a compound or mixture formed by combining chlorid of lime, $CaOCl_2$, sulfuric acid, $H_2SO_4$, of about 66° Baumé, and an alkali preferably $K_2CO_3$, such as wood ash crystals of the anhydrous type, compounded in about the proportion of fifteen pounds of chlorid of lime, two pounds fourteen and one half ounces of sulfuric acid and five pounds of alkali and about fifty gallons of water. The proportions may be slightly varied and still be within the spirit and scope of my invention. About twenty five gallons of the compound are used to about one hundred and seventy pounds of the goods. The application of said compound to goods containing animal fiber while in the fulling mill and saturated with grease, oil and soap, which is their condition in the fulling mill and when the compound is applied, does not injuriously affect the animal fiber.

As is well known the goods when transferred from the fulling mill to the washer are impregnated with the natural grease of the wool and with more or less foreign vegetable matter and are also thoroughly saturated with the soap. While in this condition and while in the wash they are subjected to the action of the compound above referred to for about fifteen minutes or until chemical action ceases. They are then thoroughly washed and rinsed with pure water to remove the chemicals and foreign substance. They are then submitted to the action of sulfur fumes.

I claim:—

1. The herein described process of bleaching union cotton and wool goods which consists in saturating them, while charged with the natural grease of the wool and with foreign vegetable matter, with a neutral soap, then transferring them to the washer and while in the wash adding water and agitating them to raise a lather and while in the wash and in the lather subjecting them to the action of a compound formed of chlorid of lime, an alkali, sulfuric acid and water until chemical action ceases, then thoroughly washing and rinsing the goods and then subjecting them to the action of fumes of sulfur.

2. The herein described process of bleaching union cotton and wool goods which consists in saturating them, while charged with the natural grease of the wool and with foreign vegetable matter, with a neutral soap, then transferring them to the washer adding water to raise a lather and then subjecting them to a compound formed by the union of chlorid of lime and alkali, sulfuric acid and water in about the proportion of fifteen pounds of chlorid of lime, five pounds of alkali, two pounds fourteen and one half ounces of sulfuric acid and fifty gallons of water, until chemical action ceases, then subjecting them to the fumes of sulfur.

JAMES S. ARMSTRONG.

Witnesses:
CHARLES W. COOLIDGE,
GEORGE R. ARMSTRONG.